United States Patent
Campos

(10) Patent No.: US 9,147,157 B2
(45) Date of Patent: Sep. 29, 2015

(54) METHODS AND APPARATUS FOR IDENTIFYING SPECTRAL PEAKS IN NEURONAL SPIKING REPRESENTATION OF A SIGNAL

(71) Applicant: QUALCOMM Incorporated, San Diego, CA (US)

(72) Inventor: Michael Campos, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 305 days.

(21) Appl. No.: 13/669,521

(22) Filed: Nov. 6, 2012

(65) Prior Publication Data

US 2014/0129496 A1    May 8, 2014

(51) Int. Cl.
  G06F 15/18  (2006.01)
  G06N 3/04   (2006.01)

(52) U.S. Cl.
  CPC ...................................... *G06N 3/049* (2013.01)

(58) Field of Classification Search
  CPC ............ G06N 3/049; G06N 3/02; G06N 3/08
  See application file for complete search history.

(56) References Cited

U.S. PATENT DOCUMENTS

| | | |
|---|---|---|
| 4,774,677 A | 9/1988 | Buckley |
| 5,285,522 A | 2/1994 | Mueller |
| 5,404,422 A | 4/1995 | Sakamoto et al. |
| 5,533,383 A | 7/1996 | Greene et al. |
| 5,598,508 A | 1/1997 | Goldman |
| 5,784,191 A | 7/1998 | Wood |
| 5,884,626 A | 3/1999 | Kuroda et al. |
| 6,428,484 B1* | 8/2002 | Battmer et al. ............ 600/554 |
| 7,430,546 B1 | 9/2008 | Suri |
| 7,515,966 B1 | 4/2009 | Litvak et al. |
| 8,139,787 B2 | 3/2012 | Haykin et al. |
| 8,175,283 B2 | 5/2012 | Stoop et al. |
| 8,200,593 B2 | 6/2012 | Guillen et al. |
| 2007/0083365 A1 | 4/2007 | Shmunk |
| 2008/0219466 A1 | 9/2008 | Pishehvar et al. |
| 2009/0299742 A1 | 12/2009 | Toman et al. |

(Continued)

FOREIGN PATENT DOCUMENTS

WO        WO0001200 A1     1/2000

OTHER PUBLICATIONS

Eguia et al., "A Biophysical Model for Modulation Frequency Encoding in the Cochlear Nucleus", 2010, Journal of Physiology—Paris 104, pp. 118-127.*

(Continued)

*Primary Examiner* — Jeffrey A Gaffin
*Assistant Examiner* — Paulinho E Smith
(74) *Attorney, Agent, or Firm* — Rupit M. Patel

(57) ABSTRACT

Certain aspects of the present disclosure provide methods and apparatus for identifying spectral peaks in a neuronal spiking representation of a signal, such as an auditory signal. One example method generally includes receiving a signal; filtering the signal into a plurality of channels using a plurality of filters having different frequency passbands; sending the filtered signal in each of the channels to a first type of spiking neuron model; sending the filtered signal in each of the channels to a second type of spiking neuron model; and identifying one or more spectral peaks in the signal based on a first output of the first type of spiking neuron model and a second output of the second type of spiking neuron model for each of the channels.

64 Claims, 16 Drawing Sheets

(56) References Cited

U.S. PATENT DOCUMENTS

| | | |
|---|---|---|
| 2010/0198300 A1 | 8/2010 | Smith |
| 2010/0204751 A1 | 8/2010 | Keller et al. |
| 2011/0313309 A1* | 12/2011 | Nicol et al. .................. 600/544 |
| 2012/0004706 A1 | 1/2012 | Meister et al. |
| 2012/0023051 A1 | 1/2012 | Pishehvar et al. |
| 2014/0129495 A1 | 5/2014 | Campos |
| 2014/0129497 A1 | 5/2014 | Campos |

OTHER PUBLICATIONS

Hewitt et al., "A Computer Model of Amplitude-Modulation Sensitvity of Single Units in the Inferior Colliculus", Apr. 1994, Journal Acoustical Society of America, vol. 95, pp. 2145-2159.*
Arnott, et al., "Onset Neurones in the Anteroventral Cochlear Nucleus Project to the Dorsal Cochlear Nucleus," JARO 5: 153-170 (2004).
Bello, et al., "A tutorial on onset detection in music signals," IEEE Transactions on Speech and Audio Processing, vol. 13, No. 5, Part 2, 2005, pp. 1035-1047.
Blackburn, et al., "The Representations of the Steady-State Vowel Sound /e/ in the Discharge Patterns of Cat Anteroventral Cochlear Nucleus Neurons," Journal of Neurophysiology, Bol. 63, No. 5, May 1990, pp. 1191-1212.
Ferragamo, et al., "Octopus Cells of the Mammalian Ventral Cochlear Nucleus Sense the Rate of Depolarization," J Neurophysiol, 87: 2262-2270, 2002.
Fettiplace, et al., "The sensory and motor roles of auditory hair cells," Nature Reviews Neuroscience, Jan. 2006, vol. 7, No. 1, pp. 19-29.
Goodman, et al., "Spike-Timing-Based Computation in Sound Localization," PLoS Computation Biology, Nov. 2010, vol. 6, No. 11, pp. 1-17.
Jones, et al., "Toward a digital neuromorphic pitch extraction system," IEEE Transactions on Neural Networks, vol. 11, No. 4, Jul. 2000, pp. 978-987.
Kim, et al., "Neural spike sorting under nearly 0-dB signal-to-noise ratio using nonlinear energy operator and artificial neural-network classifier," IEEE Transactions on Biomedical Engineering, Oct. 2000, vol. 47, No. 10, pp. 1406-1411.
Konishi, et al., "Deciphering the Brain's Codes," Neural Computation, 1991, vol. 3, pp. 1-18.
Kraus, et al., "Music training for the development of auditory skills," Nature Reviews Neuroscience 11, 599-605 (Aug. 2010).
Krishnan, et al., "Encoding of pitch in the human brainstem is sensitive to language experience," Cognitive Brain Research 25 (2005) 161-168.
May, et al., "Vowel Representations in the Ventral Cochlear Nucleus of the Cat: Effects of Level, Background Noise, and Behavioral State," J Neurophysiol 79:1755-1767, 1998.
Meyer, et al., "Structure and function of cochlear afferent innervation," Current Opinion in Otolaryngolohgy & Head and Neck Surgery, 2010.
Moser, et al., "Mechanisms underlying the temporal precision of sound coding at the inner hair cell ribbon synapse," J Physiol 576.1 (2006) pp. 55-62.
Oertel, et al., "What's a cerebellar circuit doing in the auditory system?," TRENDS in Neuroscience, vol. 27, No. 2, Feb. 2004, pp. 104-110.
Paolini, et al., "Fast Inhibition Alters First Spike Timing in Auditory Brainstem Neurons," J Neurophysiol 92: 2615-2621, 2004.
Roberts, at al., "Design principles of sensory processing in cerebellum-like structures: Early stage processing of electrosensory and auditory objects," Biol Cybern (2008) 98:491-507.
Ryugo, et al., "Primary innervation of the avian and mammalian cochlear nucleus," Brain Research Bulletin, 60 (2003). pp. 435-456.
Sullivan, at al,, "Segregation of stimulus phase and intensity coding in the cochlear nucleus of the barn owl," The Journal of Neuroscience, Jul. 1984, vol. 4, No, 7, pp. 1787-1799.
Sumner, et al., "A revised model of the inner-hair cell and auditory nerve comples," The Journal of the Acoustical Society of America, 2002, vol. 111, No. 5, pp. 2178-2188.
Taberner, et al., "Response Properties of Single Auditory Nerve Fibers in the Mouse," J Neurophysiol 93: 557-589, 2005.
The Synaptic Organization of the Brain. Fifth Edition. Gordon M. Shepherd, Ed., Young and Oertel, Chapter 4, Cochlear Nucleus, 2004.
Tzounofoulos, "Mechanisms of Synaptic Plasticity in the Dorsal Cochlear Nucleus: Plasticity-Induced Changes That Could Underlie Tinnitus," American Journal of Audiology, vol. 17, Dec. 2008, pp. S170-S175.
International Search Report and Written Opinion—PCT/US2013/065536—ISA/EPO—Feb. 10, 2014.
Liu, J., et al., "A biologically inspired spiking neural network for sound localisation by the inferior colliculus", Proceedings of the 18th International Conference on Artificial Neural Networks (ICANN '08); in Lecture Notes in Computer Science, vol. 5164, Sep. 3, 2008, pp. 396-405, XP019106156, DOI: 10.1007/978-3-540-87559-8_41, the whole document.
Liu, J., et al., "Multiple sound source localisation in reverberant environments inspired by the auditory midbrain", Proceedings of the 19th International Conference on Science, vol. 5768, Sep. 14, 2009, pp. 208-217, XP019128893, DOI: 10.1007/978-3-642-04274-4 22, the whole document.
Newton, M. J., et al., "A neurally inspired musical instrument classification system based upon the sound onset", The Journal of the Acoustical Society of America, vol. 131, No. 6, Jun. 14, 2012, pp. 4785-4798, XP012160286, DOI: 10.1121/1.4707535, the whole document.
Smith, L.S., "The auditory what and where tasks", AISB Quarterly, No. 120, 2005, p. 5, XP055099434, ISSN: 0268-4179, the whole document.
Wall, J. A., et al., "Spiking neural network model of sound localization using the interaural intensity difference", IEEE Transactions on Neural Networks and Learning Systems, vol. 23, No. 4, Feb. 3, 2012, pp. 574-586, XP011429212, DOI: 10.1109/TNNLS.2011.2178317, the whole document.
Wall, J. A., et al., "Spiking neuron models of the medial and lateral superior olive for sound localisation", Proceedings of the IEEE International Joint Conference on Neural Networks (IJCNN'08), Jun. 1, 2008, pp. 2641-2647, XP031327904, DOI: 10.1109/IJCNN.2008. 4634168, the whole document.
Wittig Jr, J.H., "Encoding and enhancing acoustic information at the first stages of the auditory system", Ph.D. thesis proposal from the University of Pennsylvania, Apr. 6, 2004, pp. 1-61, XP055099638.
Garcia G.C., et al.. "A Biophysical Model for Modulation Frequency Encoding in the Cochlear Nucleus," Journal of Physiology, 2009, vol. 104 (3-4), pp. 118-127.
Hewitt M.J., et al., "A Computer Model of Amplitude-Modulation Sensitivity of Single Units in the Inferior Colliculus," The Journal of the Acoustical Society of America, 1994, vol. 95 (4), pp. 2145-2159.

* cited by examiner

METHODS AND APPARATUS FOR IDENTIFYING SPECTRAL PEAKS IN NEURONAL SPIKING REPRESENTATION OF A SIGNAL

CROSS-REFERENCE TO RELATED APPLICATIONS

This application is related to U.S. patent application Ser. No. 13/669,516, filed herewith and entitled "METHODS AND APPARATUS FOR TRANSDUCING A SIGNAL INTO A NEURONAL SPIKING REPRESENTATION," and to U.S. patent application Ser. No. 13/669,534, filed herewith and entitled "METHODS AND APPARATUS FOR PERFORMING ONSET DETECTION IN A NEURONAL SPIKING REPRESENTATION OF A SIGNAL," which are both herein incorporated by reference.

BACKGROUND

1. Field

Certain aspects of the present disclosure generally relate to neural networks and, more particularly, to identifying spectral peaks in a neuronal spiking representation of a signal.

2. Background

An artificial neural network is a mathematical or computational model composed of an interconnected group of artificial neurons (i.e., neuron models). Artificial neural networks may be derived from (or at least loosely based on) the structure and/or function of biological neural networks, such as those found in the human brain. Because artificial neural networks can infer a function from observations, such networks are particularly useful in applications where the complexity of the task or data makes designing this function by hand impractical.

One type of artificial neural network is the spiking neural network, which incorporates the concept of time into its operating model, as well as neuronal and synaptic state, thereby increasing the level of realism in this type of neural simulation. Spiking neural networks are based on the concept that neurons fire only when a membrane potential reaches a threshold. When a neuron fires, it generates a spike that travels to other neurons which, in turn, raise or lower their membrane potentials based on this received spike.

A neural network may be emulated in software or in hardware (e.g., by an electrical circuit) and utilized in a large range of applications, such as image and pattern recognition, machine learning, motor control, and the like. Each neuron (or neuron model) in the neural system may be implemented as a neuron circuit. The neuron membrane charged to the threshold value initiating the output spike may be implemented, for example, as a capacitor that integrates an electrical current flowing through it.

SUMMARY

Certain aspects of the present disclosure generally relate to identifying spectral peaks in a neuronal spiking representation of a signal, such as an auditory signal.

Certain aspects of the present disclosure provide a method for neural processing. The method generally includes receiving a signal; filtering the signal into a plurality of channels using a plurality of filters having different frequency passbands; sending the filtered signal in each of the channels to a first type of spiking neuron model; sending the filtered signal in each of the channels to a second type of spiking neuron model; and identifying one or more spectral peaks in the signal based on a first output of the first type of spiking neuron model and a second output of the second type of spiking neuron model for each of the channels.

Certain aspects of the present disclosure provide an apparatus for neural processing. The apparatus generally includes a processing system configured to receive a signal; to filter the signal into a plurality of channels using a plurality of filters having different frequency passbands; to send the filtered signal in each of the channels to a first type of spiking neuron model; to send the filtered signal in each of the channels to a second type of spiking neuron model; and to identify one or more spectral peaks in the signal based on a first output of the first type of spiking neuron model and a second output of the second type of spiking neuron model for each of the channels.

Certain aspects of the present disclosure provide an apparatus for neural processing. The apparatus generally includes means for receiving a signal; means for filtering the signal into a plurality of channels using a plurality of filters having different frequency passbands; means for sending the filtered signal in each of the channels to a first type of spiking neuron model; means for sending the filtered signal in each of the channels to a second type of spiking neuron model; and means for identifying one or more spectral peaks in the signal based on a first output of the first type of spiking neuron model and a second output of the second type of spiking neuron model for each of the channels.

Certain aspects of the present disclosure provide a computer program product for neural processing. The computer program product generally includes a computer-readable medium having instructions executable to receive a signal; to filter the signal into a plurality of channels using a plurality of filters having different frequency passbands; to send the filtered signal in each of the channels to a first type of spiking neuron model; to send the filtered signal in each of the channels to a second type of spiking neuron model; and to identify one or more spectral peaks in the signal based on a first output of the first type of spiking neuron model and a second output of the second type of spiking neuron model for each of the channels.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Example Auditory Processing

Certain aspects of the present disclosure provide methods and apparatus for transducing a signal into a neuronal spiking representation using at least two populations of spiking neurons. Before delving into the details of these aspects, some explanation of human auditory processing is in order.

Figure 1:
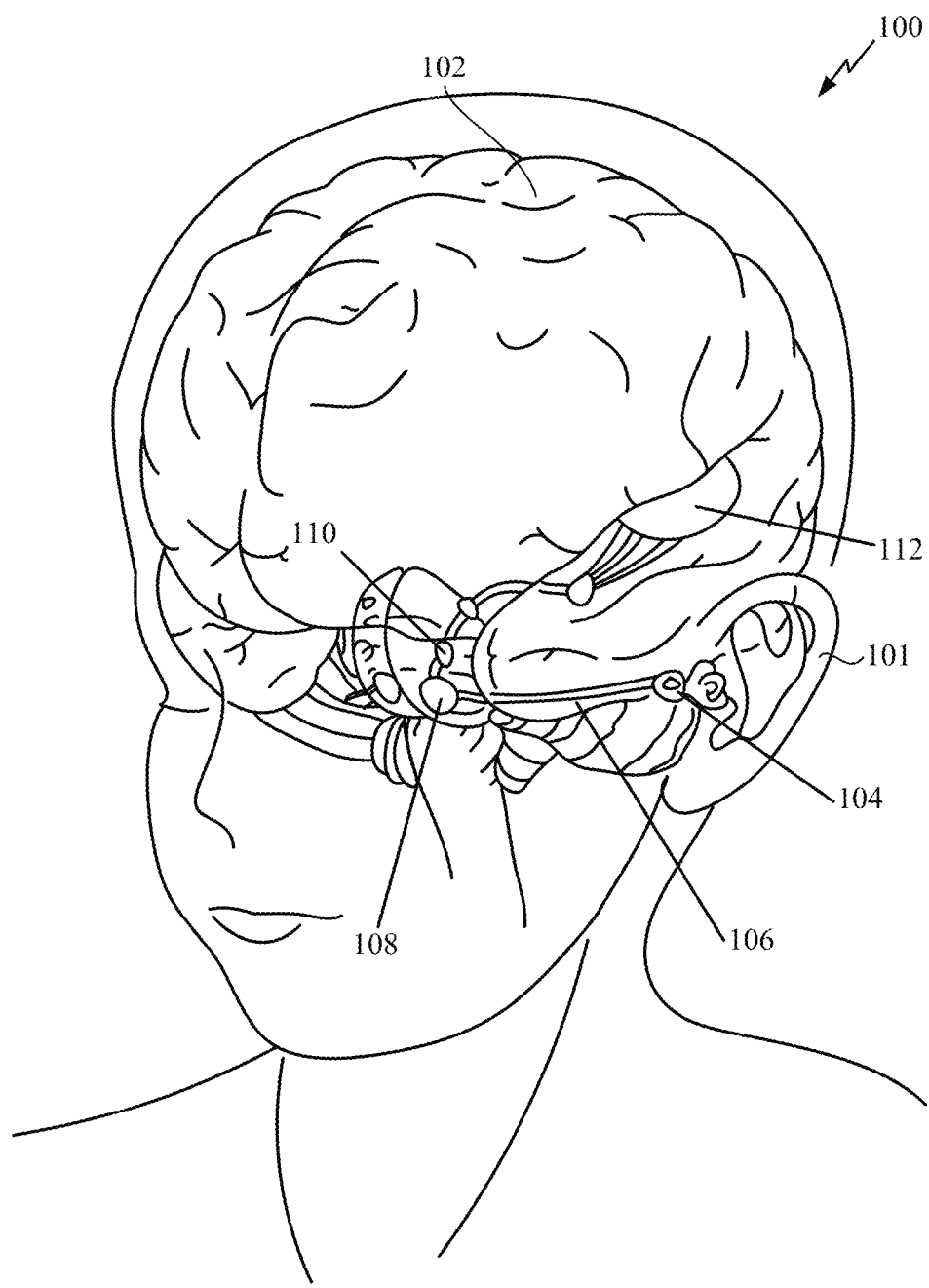
FIG. 1 illustrates the various areas involved in auditory processing for a human, in accordance with certain aspects of the present disclosure.

FIG. 1 illustrates a diagram of an example human head 100 and the various areas involved in auditory processing, in accordance with certain aspects of the present disclosure. Sound vibrations received by the external ear 101 are transduced into electrical signals that are eventually interpreted by the brain 102, with several other components that first process these signals. Sound vibrations received by the external ear 101 travel via the ear canal to the tympanic membrane (i.e., the eardrum) in the middle ear, which relays the vibrations to the cochlea 104.

Figure 2:
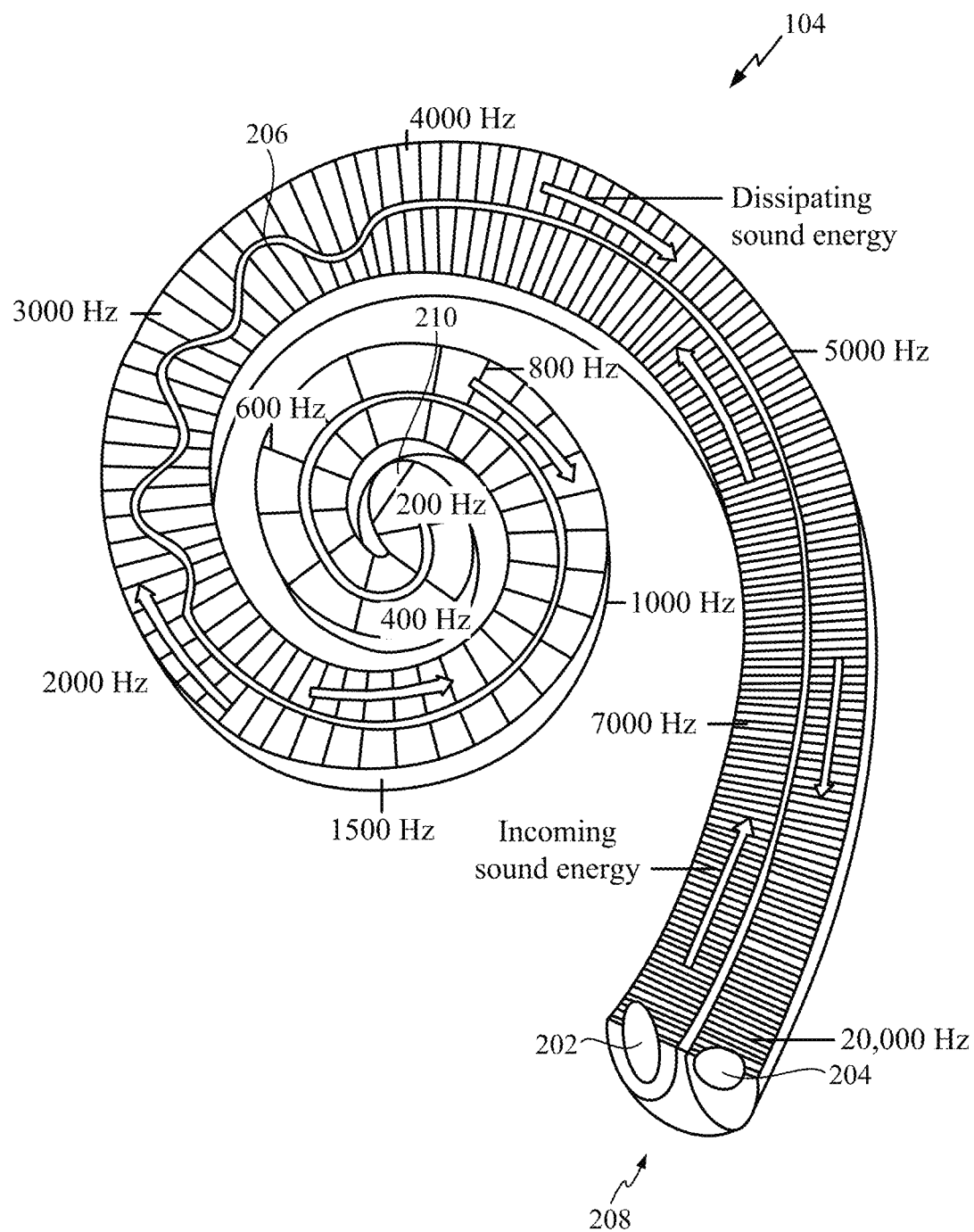
FIG. 2 conceptually illustrates frequency selectivity within a human cochlea, in accordance with certain aspects of the present disclosure.

As illustrated in FIG. 2, the cochlea 104 is a spiraled, hollow, conical chamber of bone that is filled with fluid and is connected with the middle ear by two membrane-covered openings in the base of the cochlea: the oval window 202 (for receiving incoming sound energy) and the round window 204 (for dissipating this received energy). The basilar membrane 206 separates the incoming and outgoing sound energy. Relayed sound vibrations in the fluid of the cochlea 104 move the cilia (i.e., the hair cells) of the organ of Corti, which translate this movement into electrical impulses. Based on the degree of stiffness in the basilar membrane 206, the cilia are tuned to certain sound frequencies according to their location in the cochlea 104. The basilar membrane is stiffest near the oval window 202, and therefore, only high frequency vibrations (e.g., those at 20 kHz) are capable of moving the basilar membrane and, in turn, the cilia. As one moves from the base 208 to the apex 210 of the cochlea 104, the basilar membrane 206 becomes less and less stiff, such that lower and lower frequencies are capable of moving the membrane, as shown.

Returning to FIG. 1, the electrical impulses generated by the cochlea 104 travel via the cochlear nerve 106 (also known as the auditory nerve) to an area of the brain 102 known as the cochlear nucleus. The cochlear nucleus is divided into a ventral cochlear nucleus 108 and a dorsal cochlear nucleus (DCN) 110. The ventral cochlear nucleus 108 is further subdivided into the anteroventral cochlear nucleus (AVCN) 108*a* and the posteroventral cochlear nucleus (PVCN) 108*p* (illustrated in FIG. 7). Axons from the spiral ganglion cells corresponding to lower sound frequencies innervate the lateral-ventral portions of the DCN 110 and the ventrolateral portions of the AVCN 108*a*. In contrast, axons from the higher frequency organ of Corti cilia project to the dorsal portion of the AVCN 108*a* and the dorsal-medial portions of the DCN 110. Mid-frequency projections are located between these two extremes, such that the frequency spectrum is preserved. Because only a few cochlear cilia synapse on the dendrites of a nerve cell in the spiral ganglion, and the axon from that nerve cell synapses on only a very few dendrites in the cochlear nucleus, the cochlear nucleus inherits the tone-based organization (referred to as the "tonotopic" organization) of the cochlea 104.

After additional auditory processing in the brain 102 (e.g., by the lemniscal nucleus and the medial geniculate nucleus) along the auditory conduction pathway, auditory signals eventually reach the auditory cortex 112 for interpretation of the received sound vibrations.

Figure 3:
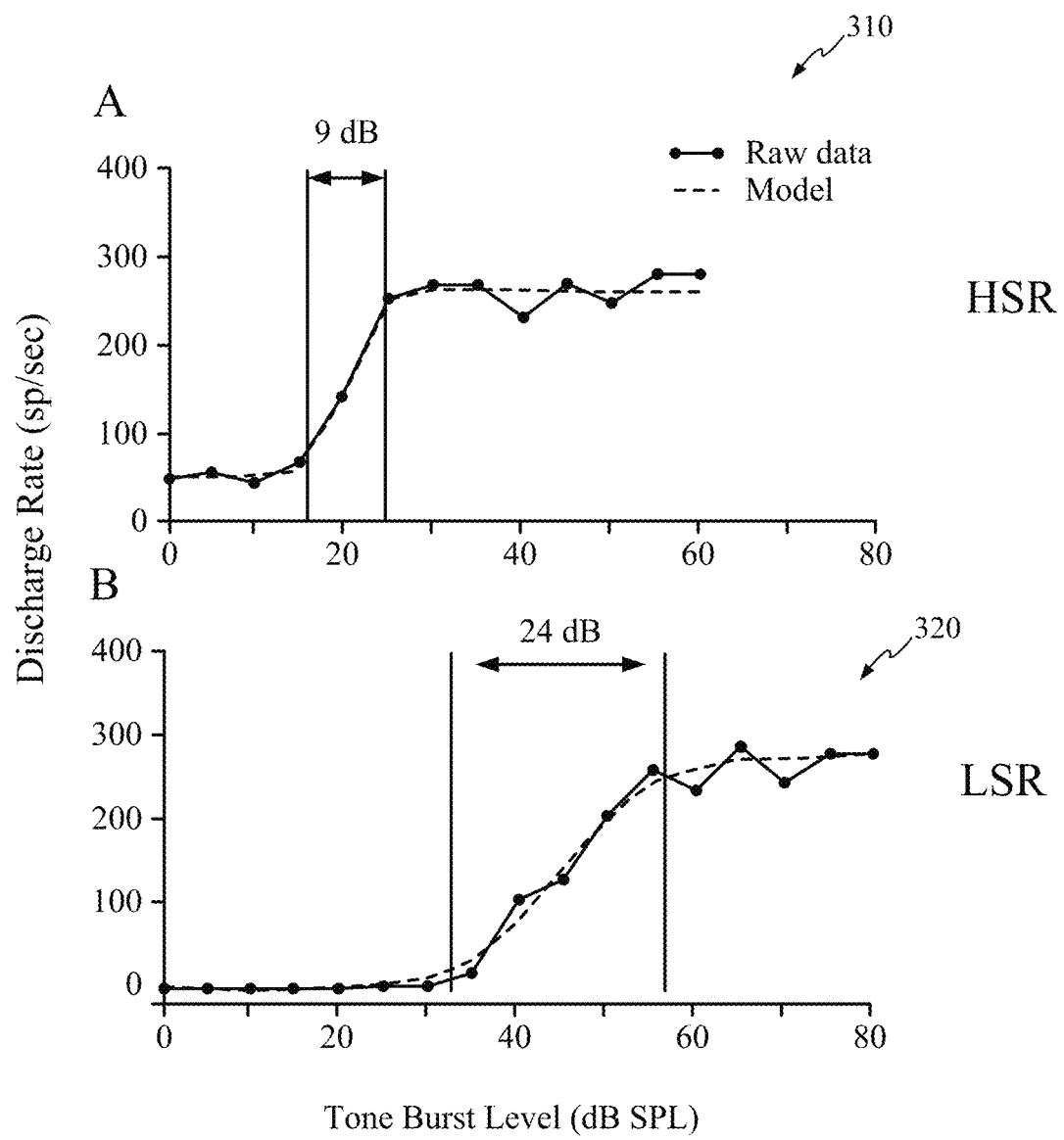
FIG. 3 illustrates example graphs of discharge rate versus intensity for high spontaneous rate (HSR) neurons and low spontaneous rate (LSR) neurons, in accordance with certain aspects of the present disclosure.

The auditory nerve (i.e., the cochlear nerve 106) includes at least two different types of neurons. As illustrated in the graph 310 of discharge rate (in spikes per second) versus tone burst level (in decibels of sound pressure level (SPL)) in FIG. 3 from Taberner & Liberman, *Response Properties of Single Auditory Nerve Fibres in the Mouse*, J. Neurophysiol. 2005, high spontaneous rate (HSR) neurons have a relatively small dynamic range (e.g., 9 dB). Due to this small dynamic range, HSR neurons may be specialized for encoding temporal information and may also have phase-locking capabilities. In contrast, the auditory nerve's low spontaneous rate (LSR) neurons have a larger dynamic range (e.g., 24 dB) than HSR neurons and may thus be specialized for encoding intensity information with rate. The variation in neuron types may arise from differences in a single parameter: maximum calcium (Ca) conductance.

Figure 4:
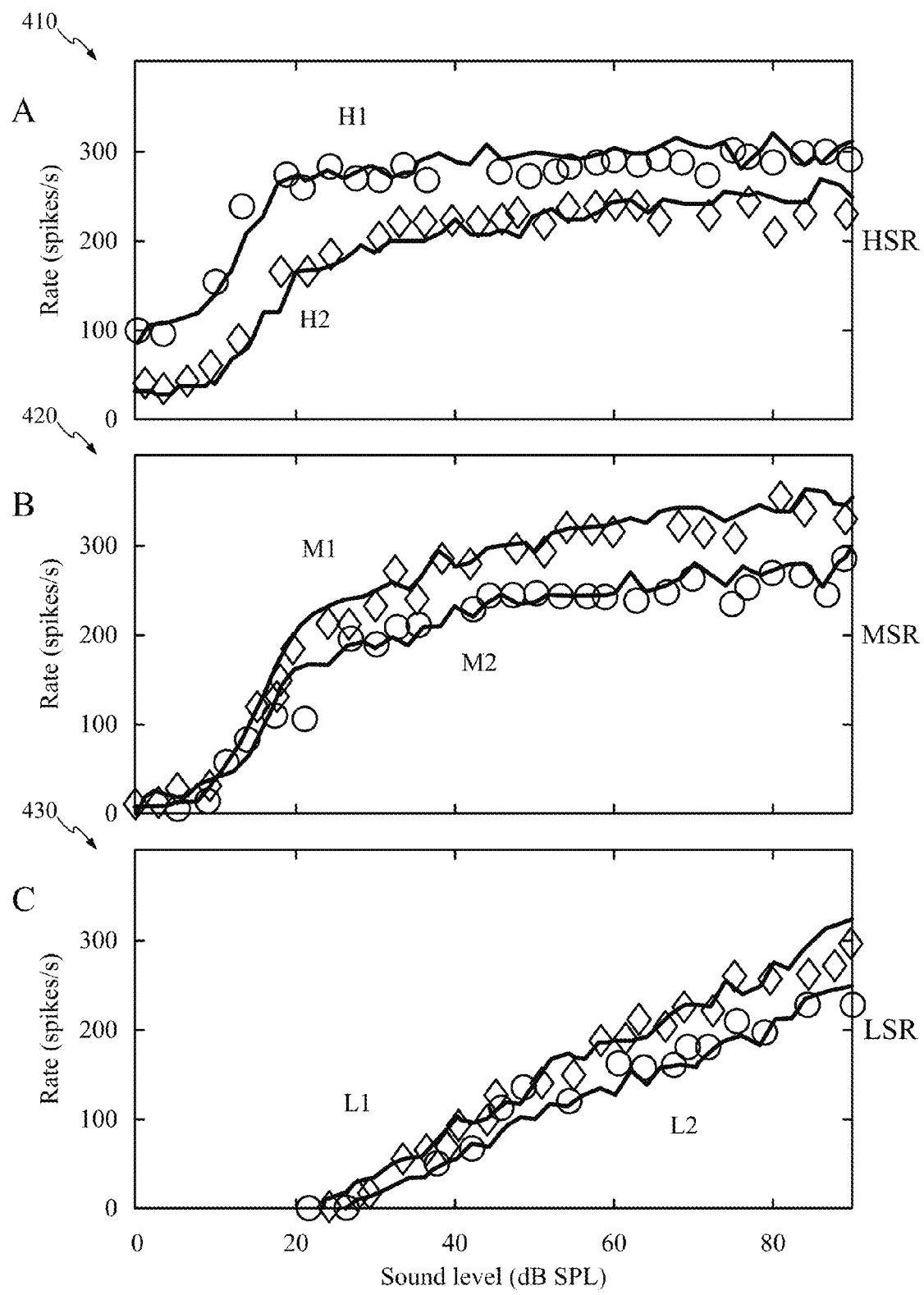
FIG. 4 illustrates example graphs of discharge rate versus intensity for HSR, medium spontaneous rate (MSR), and LSR neurons, in accordance with certain aspects of the present disclosure.

Some scholars may consider the auditory nerve as having at least a third type of neuron: medium spontaneous rate (MSR) neurons. For example, the graph 420 of FIG. 4 illustrates the discharge rate versus sound level for MSR neurons (from Sumner et al., *A revised model of the inner-hair cell and auditory nerve complex*, J. Acoust. Soc. Am., 2002). Comparing the graph 420 for MSR neurons with the graph 410 for HSR neurons and the graph 430 for LSR neurons illustrates the different characteristic behaviors of these neurons.

Example Transduction of Signals into Spikes

Despite decades of research, conventional auditory processing methods are not able to achieve the same performance as human listeners on a variety of tasks, such as speech comprehension. The performance gap may be attributable, at least in part, to the contrast between the way that the human brain transforms and represents auditory inputs and the way that auditory inputs are transformed and represented in conventional approaches to the problem.

Figure 5:
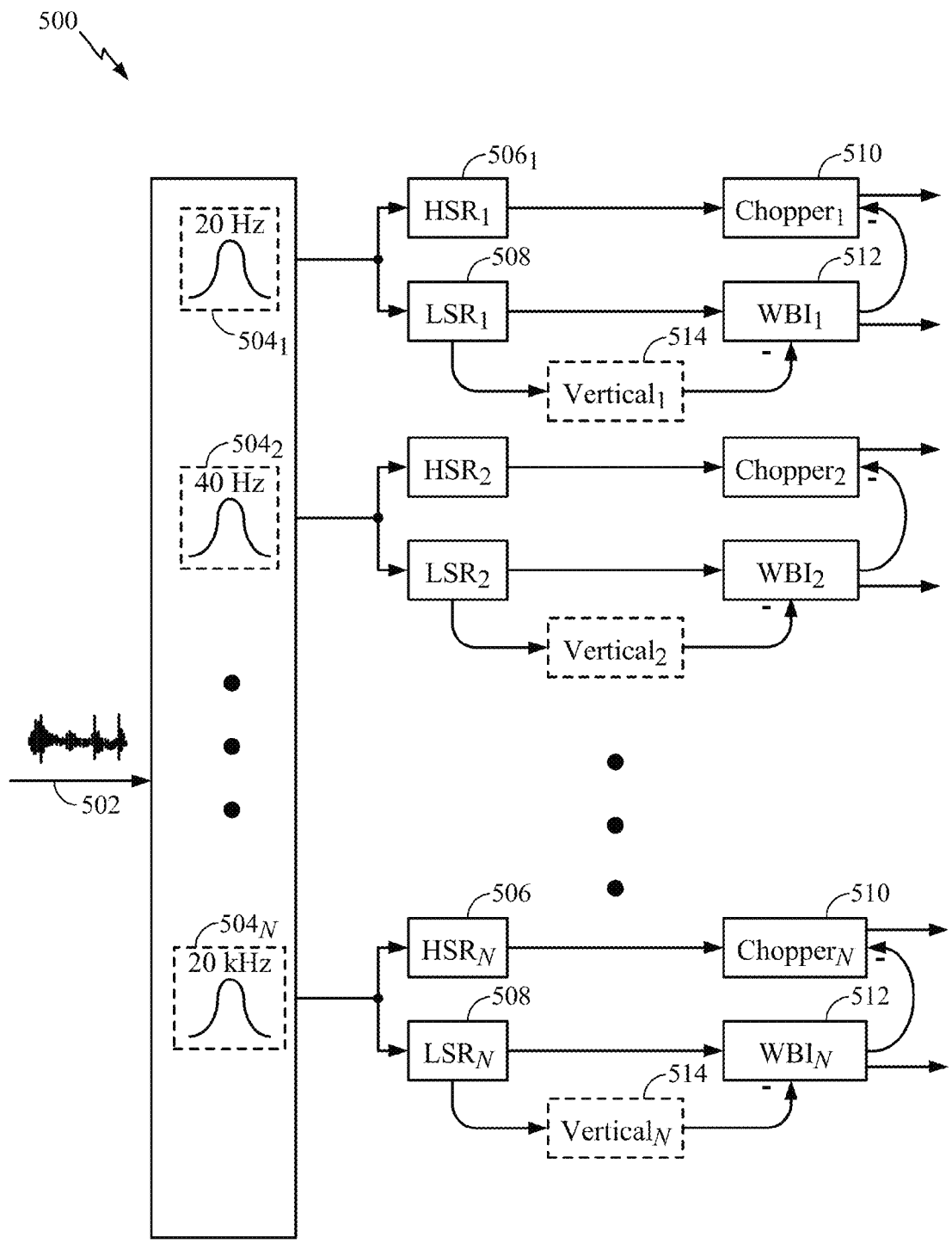
FIG. 5 is an example system diagram for auditory processing, in accordance with certain aspects of the present disclosure.

Certain aspects of the present disclosure provide a model of the first stages of auditory processing in the human brain, as illustrated in the neural network 500 of FIG. 5. This model generates a useful representation of audio signals that is designed to accurately capture the essence of all of the information that is transmitted to the brain via the auditory nerve. More specifically, certain aspects provide for the transduction of auditory signals into a spiking representation. Signals (e.g., auditory signals) 502 may first be filtered such that N multiple channels $504_1$-$504_N$ respond selectively to different frequency bands. For auditory signals, the multiple channels may most likely collectively span a normal hearing range (e.g., 20 Hz to 20 kHz for humans). The resulting waveforms may be half-wave rectified and scaled, and the resulting values may then be treated as a driving input for one or more abstract models of a spiking neuron.

For certain aspects, two neuron models (e.g., HSR neuron models 506 and LSR neuron models 508) that differ in just one parameter (e.g., dynamic range or phase-locking ability) are driven by the filtered waveform at each channel 504. The spiking output of these two neuron models, collected over all of the channels, may emulate the spiking output of HSR and LSR neuron populations in the auditory nerve. Other implementations may include a third neuron model (not shown) to emulate MSR neurons, or generate a distribution of neuron models that includes these exemplary types.

Each neuron population covers the frequency range. The HSR population may exhibit phase locking, while the LSR population may exhibit relatively larger dynamic range with respect to sound intensity. The LSR population may not phase lock, or its phase locking capability may be weaker than the HSR population. The HSR population may fire about 40 times more often overall than the LSR population. This may be due to the HSR population having a lower spiking threshold than the LSR population. The HSR and/or the LSR neuron models may be represented by leaky-integrate-and-fire (LIF) neuron models.

With respect to known solutions, this model offers some known advantages and also has the potential to provide currently unknown advantages. Regarding known advantages, first, the spiking mechanism of HSR neurons is known to encode "phase lock" of signals up to about 4 kHz. This phase information is typically lost or ignored in conventional auditory front-end systems. Second, the use of multiple neuron models associated with each input channel is useful for subsequent processing of the spiking representation, since it is known that HSR and LSR neurons target distinct cell populations in the cochlear nucleus. Third, the spiking representation is highly compressed compared to the raw signal input. Regarding unknown advantages, this model establishes a foundation for additional models of neurally-inspired auditory processing modules, some of which are described below. In principle, an accurate model of subsequent human auditory processing may be designed that is driven by the spiking representation described herein.

Figure 6:
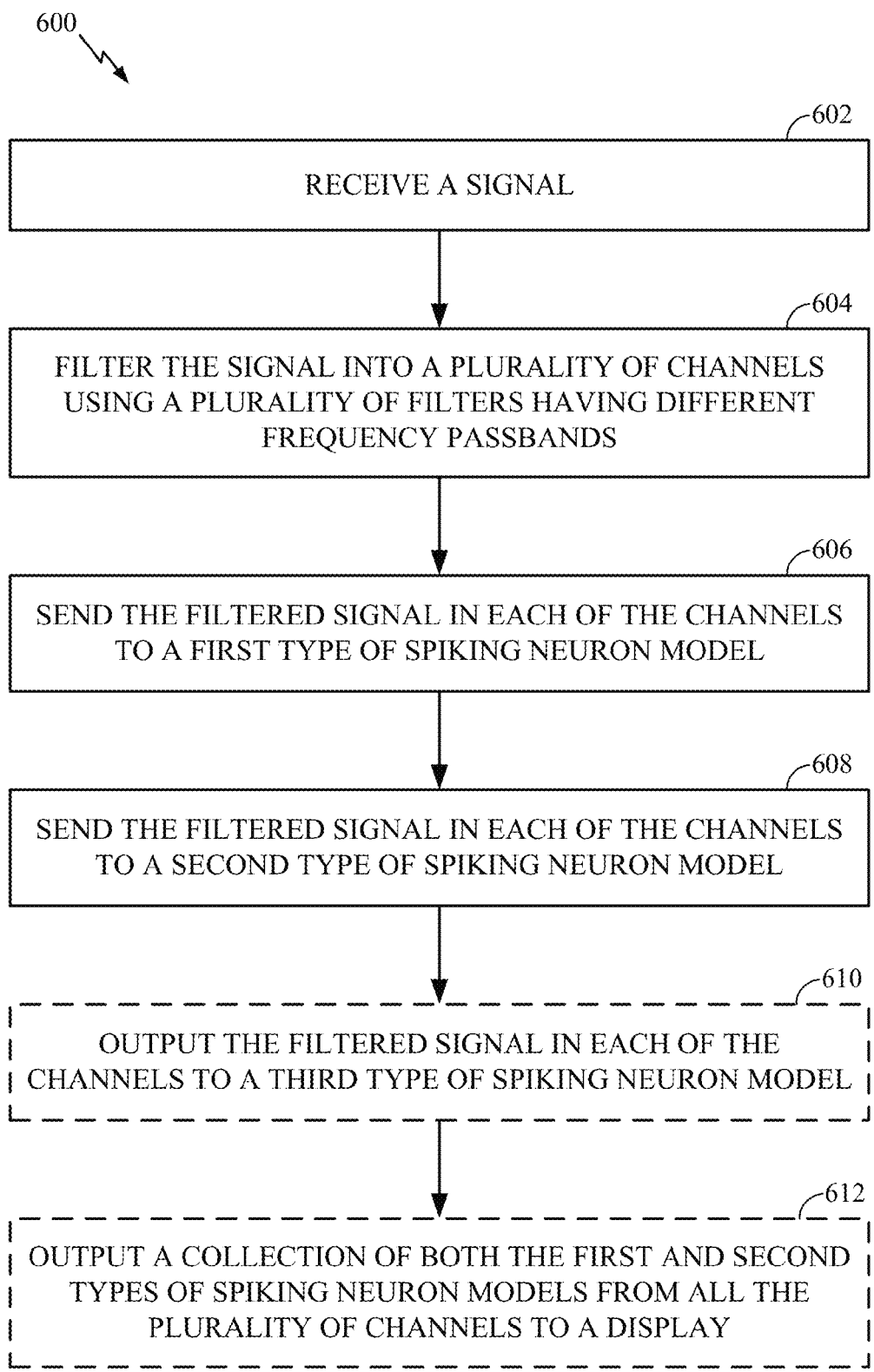
FIG. 6 is a flow diagram of example operations for transducing a signal into a neuronal spiking representation, in accordance with certain aspects of the present disclosure.

FIG. 6 is a flow diagram of example operations 600 for transducing a signal into a neuronal spiking representation, in accordance with certain aspects of the present disclosure. The operations 600 may be performed in hardware (e.g., by a processing system composed of one or more processing units), in software, or in firmware.

The operations 600 may begin, at 602, by receiving a signal. For certain aspects, the signal includes an electrical representation of an audio signal. Although the present disclosure mainly refers to auditory signals, the signal received at 602 may be any type of signal.

At 604, the signal may be filtered into a plurality of channels using a plurality of filters having different frequency passbands. For certain aspects, the plurality of channels span a hearing range of frequencies (e.g., from about 20 Hz to 20 kHz).

At 606, the filtered signal in each of the channels may be sent to a first type of spiking neuron model. The filtered signal in each of the channels may also be sent to a second type of spiking neuron model at 608. The second type may differ from the first type of spiking neuron model in at least one parameter. For certain aspects, the at least one parameter includes at least one of dynamic range, spiking threshold, phase-locking capability, or fan-out. According to certain aspects, the first type of spiking neuron model has at least one of a smaller dynamic range with respect to intensity or a greater phase-locking capability than the second type of spiking neuron model. For other aspects, the first type of spiking neuron model is specialized for encoding temporal information, and the second type of spiking neuron model is specialized for encoding intensity information. For certain aspects, the first type of spiking neuron model has a smaller fan-out than the second type of spiking neuron model. For certain aspects, the first type of spiking neuron model may represent a high spontaneous rate (HSR) neuron of an auditory nerve.

The second type of spiking neuron model may represent a low spontaneous rate (LSR) neuron of the auditory nerve. At least one of the first or second type of spiking neuron model may be a leaky-integrate-and-fire (LIF) neuron model.

At 610, the operations 600 may further include outputting the filtered signal in each of the channels to a third type of spiking neuron model. The third type may differ from the first and second types of spiking neuron model in the at least one parameter. For certain aspects, the third type of spiking neuron model represents a medium spontaneous rate (MSR) neuron of an auditory nerve.

At 612, the operations 600 may further include outputting a collection of both the first and second types of spiking neuron models from all the plurality of channels to a display.

Example Determination of Spectral Peaks

The identification of spectral peaks is an essential component of almost any speech processing system. Each vocalization of a vowel sound will contain up to six distinct spectral peaks, meaning that there will be concentrations of power in up to six frequency bands, not including the harmonics of those peaks. These peaks are a consequence of the vocalization system. While there are many methods that identify spectral peaks of an audio signal, none act upon a neuronal spiking representation of an audio signal. After transducing a signal (e.g., an auditory signal) into a neuronal spiking representation using at least two populations of spiking neurons as described above, certain aspects of the present disclosure provide a method that transforms that initial spiking representation of the signal into a new representation in which the spectral peaks can be more robustly identified. Additional useful features are gained using this method compared to conventional approaches.

Figure 7:
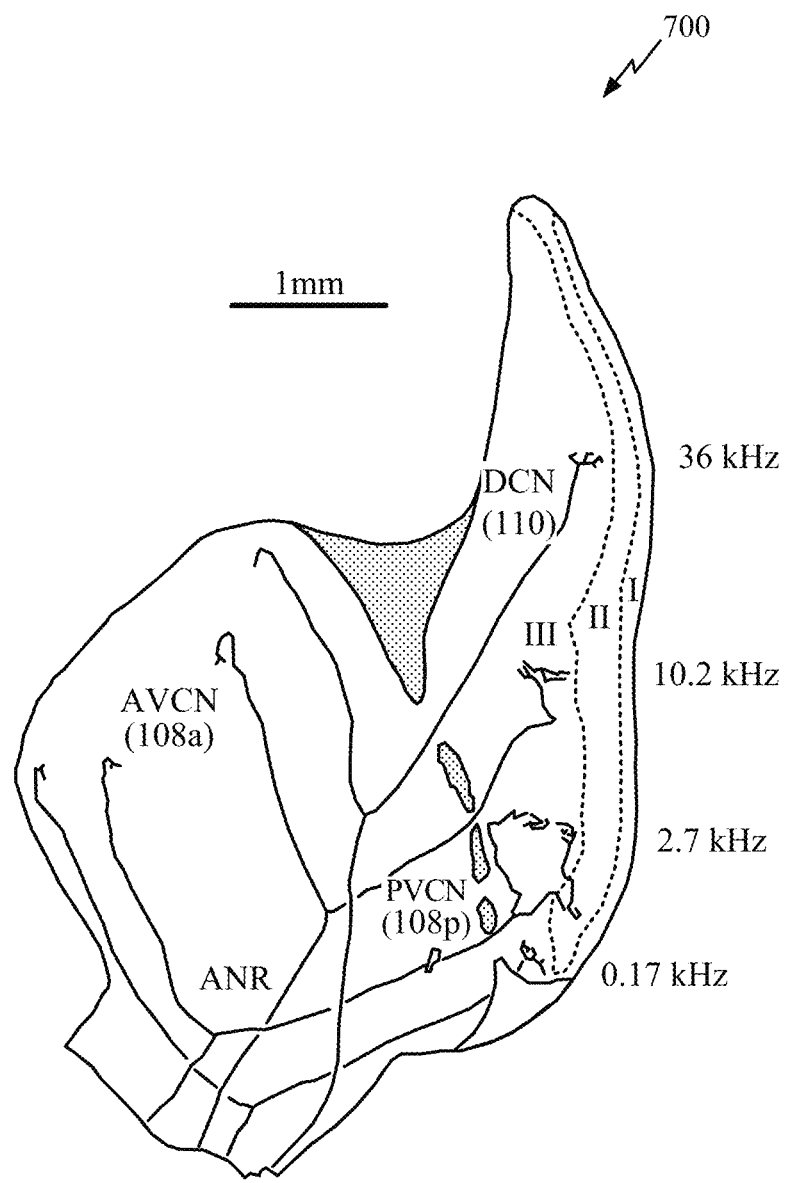
FIG. 7 conceptually illustrates an example cochlear nucleus, in accordance with certain aspects of the present disclosure.

FIG. 7 conceptually illustrates an example cochlear nucleus 700 in the mammalian auditory system, in accordance with certain aspects of the present disclosure. As described above, the cochlear nucleus 700 can be anatomically divided into the dorsal cochlear nucleus (DCN) 110 and the ventral cochlear nucleus (VCN) 108. Used for understanding speech, the VCN 108 is further divided into the anteroventral cochlear nucleus (AVCN) 108a and the posteroventral cochlear nucleus (PVCN) 108p. As illustrated by the various frequencies, the cochlear nucleus 700 contains a complete representation of all the audio information.

Neurons of at least one type in the cochlear nucleus 700 have sharper tuning and lower spiking thresholds than their auditory nerve inputs. Therefore, signal sharpening (e.g., for spectral peak detection) is performed by the cochlear nucleus.

Certain aspects of the present disclosure provide a model of a portion of the ventral cochlear nucleus (VCN) 108. The VCN 108 receives direct input from the auditory nerve (i.e., the cochlear nerve 106 in FIG. 1). Two nerve cell types within the VCN 108, termed "chopper" cells and "wide-band inhibitory" (WBI) cells are modeled. These terms can be found in the scientific literature, but other terms are also used to describe these neurons. Based on physiological evidence, the chopper neurons receive input from the HSR neuron population of the auditory nerve, and the WBI neurons receive input from the LSR neuron population of the auditory nerve. The fan-in to chopper cells is narrower than the corresponding fan-in for WBI neurons. In other words, the fan-out from the HSR neurons is smaller than the fan-out from the LSR neurons. WBI neurons inhibit chopper neurons, creating a feed-forward inhibitory circuit that results in spectral sharpening.

Chopper neurons are capable of distinguishing formants, which as used herein, generally refer to any of several frequency regions of relatively great intensity in a sound spectrum, which together determine the characteristic quality of a vowel sound. This capability of distinguishing formants enables the understanding of speech. Chopper neurons may encode formants via peak/trough locations in the population. While chopper neurons can detect peaks over the entire intensity range of hearing, human speech is typically in a range where the HSR population is saturated such that peak/trough locations cannot be resolved. Consequently, chopper neurons may compensate for the limited dynamic range of auditory nerve inputs.

WBI neurons generally have higher thresholds than chopper neurons. However, WBI neurons are more broadly tuned and have a shorter latency to first spike than chopper neurons. Removed from the characteristic frequency, WBI neurons have a relatively lower threshold and can cause a delay to the first chopper spike, which provides side bands. At the characteristic frequency, however, WBI neurons have a higher relative threshold, so inhibition arrives after the chopper neurons fire. This may help localize onset of the signal downstream.

At least some of this physiology described above is modeled in the neural network 500 of FIG. 5, where the HSR neuron models 506 drive the chopper neuron models 510 for each channel 504, and the LSR neuron models 508 drive the WBI neuron models 512 for each channel. For each channel 504, the WBI neuron model 512 also inhibits the chopper neuron model 510 to form a feed-forward inhibitory circuit. If only the inhibitory population (e.g., the WBI neuron models 512) is excited, then there may be no output from the other population (e.g., the chopper neuron models 510, which are excitatory). If input to the inhibitory population is withheld, the output of the other population may be increased. The WBI neuron models 512 may have relatively broader tuning than the chopper neuron models 510.

Additional connections from the chopper neuron models 510 to the WBI neuron models 512 may be added to increase performance. The network 500 contains additional features, notably the ability to suppress wide-band noise such that this noise does not affect the spiking representation of the signal observed within the chopper neuron population. The chopper and WBI neuron models of FIG. 5 take a spiking representation of a signal as an input and produce a spiking representation of the signal as output, where spectral peaks are more robustly resolved in the output.

Figure 8:
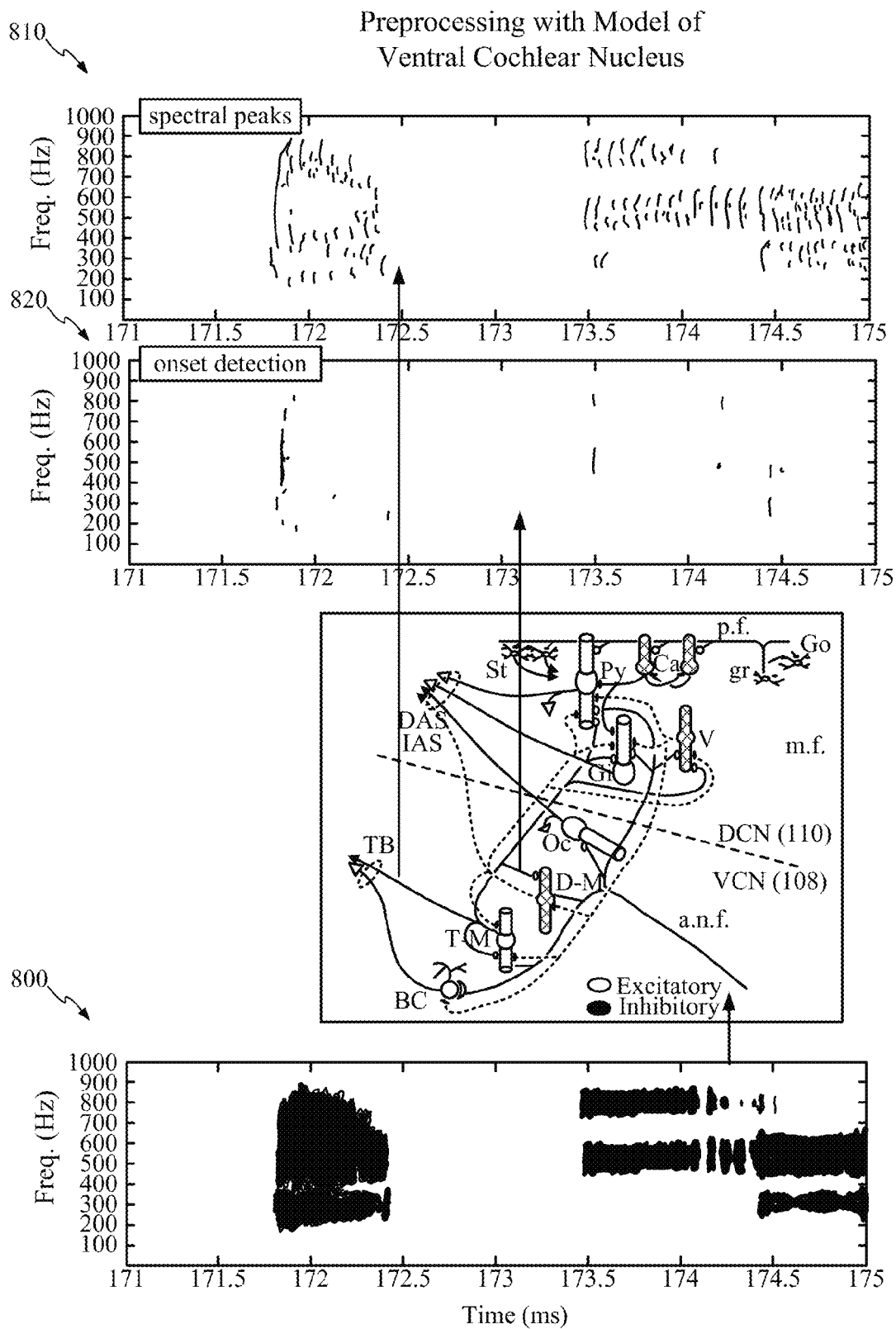
FIG. 8 illustrates spectral peak determination and onset detection of an example auditory signal, in accordance with certain aspects of the present disclosure.

FIG. 8 illustrates spectral peak determination of an example auditory signal, in accordance with certain aspects of the present disclosure. The plot 800 of channel number versus time illustrates the frequency content of an example auditory signal (as would theoretically be received by the cochlear nucleus 700 via the auditory nerve fiber bundle if all the signals in this bundle were aggregated). In FIG. 8, N=1000 channels, where the characteristic frequency of the first channel is 25 Hz and of the last channel is 12 kHz. The plot 810 illustrates the spectral peaks in the example auditory signal of the plot 800, as determined by the chopper neuron models 510 and the WBI neuron models 512 of FIG. 5.

For certain aspects, a frame timing may be determined based on the spectral determination. Lower frequencies may set the frame timing, and then higher frequencies may lock to this timing. For example, the plot 810 illustrates about 5 frames in the lower frequencies (e.g., in channels around channel 200) in the period between 171.5 and 172.5 s.

With the chopper and WBI neuron models, certain aspects of the present disclosure provide a method to compute a standard auditory processing feature (identification of spectral peaks) from a novel representation of an audio signal (a neural spiking representation). Also, because the method is based on a highly-evolved biological system, additional advantageous features are gained. Notably, the method will automatically reduce wide-band noise.

Figure 9:
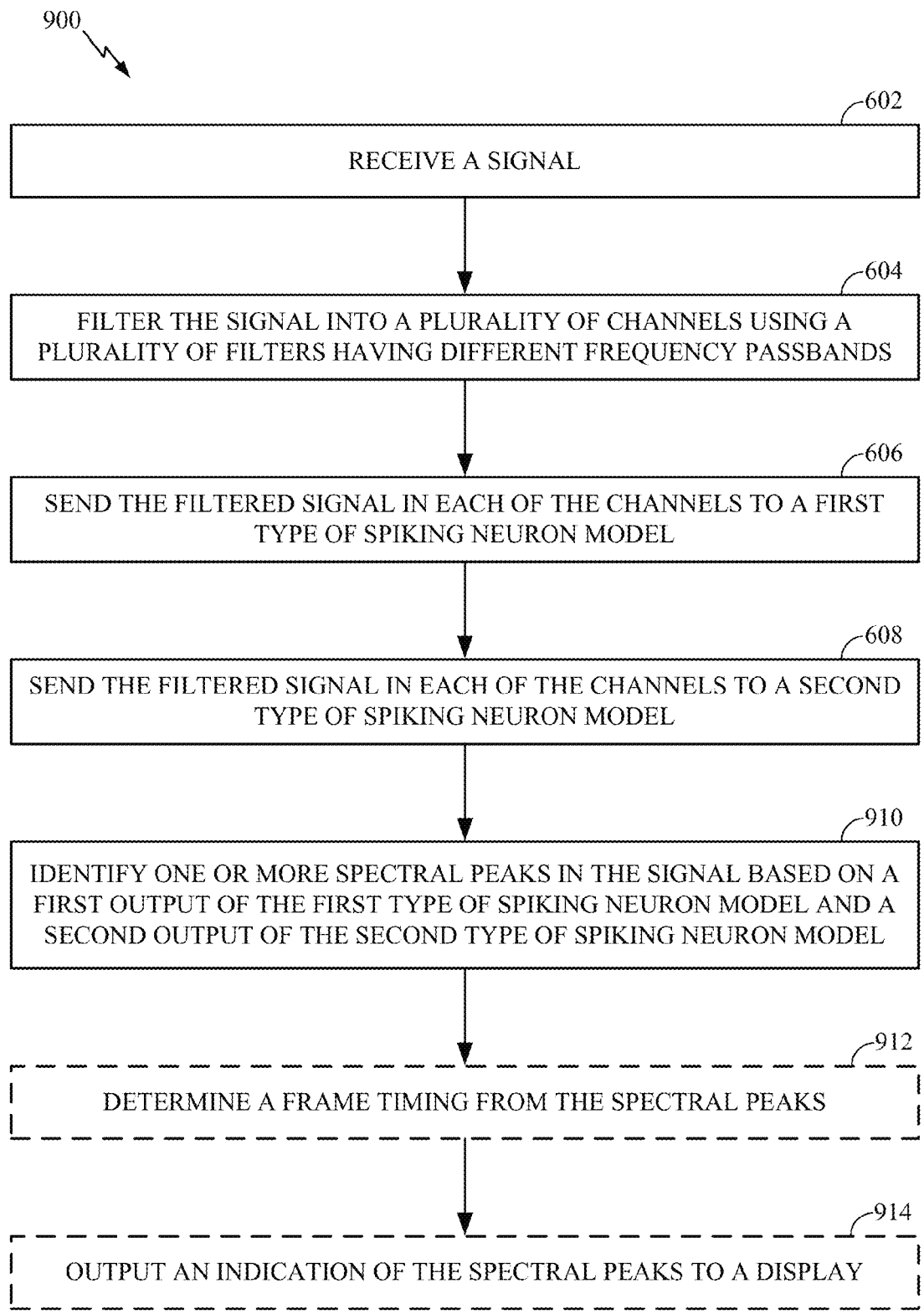
FIG. 9 is a flow diagram of example operations for identifying spectral peaks in a signal, in accordance with certain aspects of the present disclosure.

FIG. 9 is a flow diagram of example operations 900 for identifying spectral peaks in a signal, in accordance with certain aspects of the present disclosure. The operations 900 may be performed in hardware (e.g., by a processing system comprising one or more processing units), in software, or in firmware. The operations 900 may begin with operations 602-608 as described above in relation to FIG. 6.

At 910, one or more spectral peaks may be identified in the signal based on a first output of the first type of spiking neuron model and on a second output of the second type of spiking neuron model for each of the channels. According to certain aspects, identifying the spectral peaks at 910 includes sending the first output of the first type to a third type of spiking neuron model for each of the channels and sending the second output of the second type to a fourth type of spiking neuron model for each of the channels. The third type may differ from the fourth type in at least one characteristic. The third type of spiking neuron model may represent a chopper cell in a cochlear nucleus. The fourth type of spiking neuron model may represent a wideband inhibitor (WBI) cell in the cochlear nucleus. The at least one characteristic may include at least one of a spiking threshold or a bandwidth. For certain aspects, the third type may have a lower spiking threshold and may be more narrowly tuned than the fourth type of spiking neuron model. The fourth type may inhibit the third type of spiking neuron model for each of the channels. For certain aspects, identifying the spectral peaks at 910 may include using feedforward inhibition of the third type of spiking neuron model by the fourth type.

According to certain aspects, the operations 900 may optionally further include determining a frame timing from the spectral peaks at 912. For certain aspects, the operations 900 may further include outputting an indication of the spectral peaks to a display at 914.

Example Onset Detection

Figure 10:
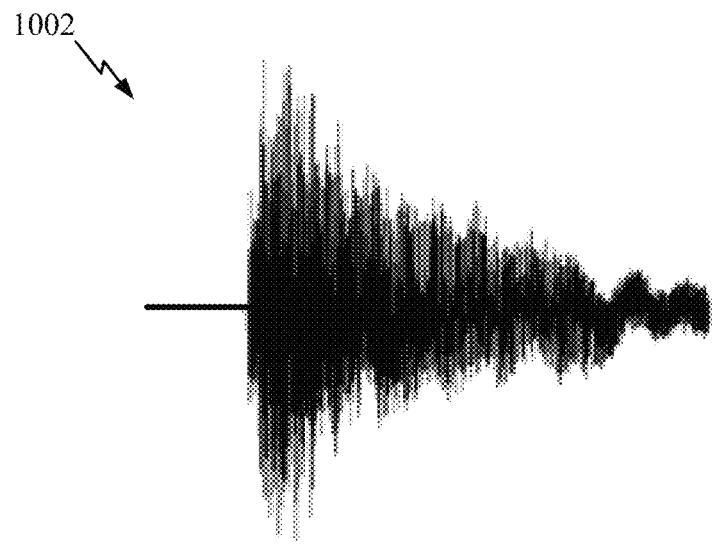
FIG. 10 illustrates the onset of an example signal, in accordance with certain aspects of the present disclosure.
Figure 10:
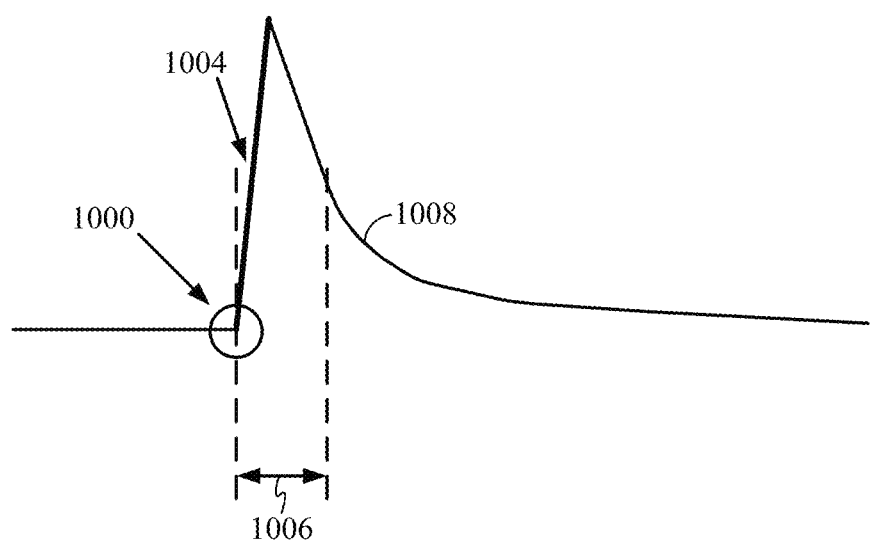

FIG. 10 illustrates various features of an example auditory signal 1002 of a single musical note, as described in Bello et al., *A Tutorial on Onset Detection in Music Signals*, IEEE Transaction on Speech and Audio Processing, 2005. As used herein, the onset 1000 of the signal 1002 generally refers to the beginning or start of the signal, in which the amplitude rises from zero (or some initial reference level) to an initial peak. The onset 1000 is related to, but different from a transient 1006. As used herein, a transient 1006 generally refers to a high-amplitude, short-duration sound at the beginning of an auditory signal, which occurs in such phenomena as speech and musical sounds. The onset 1000 is a single instant in time, typically coinciding with the start of the transient 1006. As used herein, the attack 1004 of the signal 1002 generally refers to the time interval during which the amplitude envelope increases. Following the transient 1006 of the signal 1002 is the decay 1008, in which the amplitude returns to zero (or some initial reference level).

In auditory processing, a robust algorithm for onset detection is very useful. It can focus more computationally intensive or high-bandwidth operations to post-onset intervals and thus improve the efficiency of the system as a whole. There are a variety of methods currently used in conventional approaches to auditory processing to achieve onset detection. However, none of these acts upon a neural spike representation of a signal (e.g., an auditory signal). Furthermore, conventional onset detection algorithms have certain limitations, such as the requirement to tune the algorithms for a particular problem.

Certain aspects of the present disclosure provide a functional neural model of three neuronal populations found in the cochlear nucleus 700 of mammals. These neuron types are the chopper and WBI cells of the VCN 108 and the vertical cells of the DCN 110. The chopper and WBI cells form a feedforward inhibitory circuit, as described above. The vertical cells provide feedback inhibition to the chopper and WBI cells. By virtue of connectivity patterns, the WBI cells are broadly tuned such that they respond best to broadband noise (e.g., WBI cells may be maximally driven with white noise). Vertical cells, again by virtue of connectivity patterns, are narrowly tuned, such that they respond best to spectrally dense sounds, such as speech. WBI cells are also exclusively driven by LSR neurons from the auditory nerve, which results in their selective firing to loud (especially sudden) sounds. The dynamics of the system are set so that a typical sound in a moderately noisy environment will briefly excite a large number of WBI cells, but these cells will then be quickly inhibited by vertical cells, resulting in an overall onset detection property in the population of WBI cells. This property matches the known physiology of these cells types.

At least some of this physiology described above is modeled in the example neural network 500 of FIG. 5. For each channel 504, the LSR neuron model 508 may excite a vertical neuron model 514. The vertical neuron model 514 may, in turn, inhibit the WBI neuron model 512 as shown. The inclusion of vertical neuron models 514 in the neural network 500 maintains spectral peak and onset detection functions in the representation of the VCN 108. The use of vertical neuron models 514 may also preserve spectral sharpening of the chopper neuron models 510.

Plot 820 in FIG. 8 illustrates the detected onsets in the example auditory signal of the plot 800, as determined by the chopper neuron models 510, the WBI neuron models 512, and the vertical neuron models 514 of FIG. 5. Note that onset detection may occur across multiple frequency bands in parallel.

There are additional possible implementations. For instance, in a neural network that does not include vertical neuron models 514, the WBI neuron models 512 may strongly inhibit the chopper neuron models 510, thereby producing an onset detection representation in the chopper neuron model population (i.e., the chopper neuron models 510 may perform the onset detection function). This alternate method, however, does not match the known physiology. In other aspects, an instantaneous firing rate of any or all of the neuron model types may be computed, and a threshold crossing may be sought.

Figure 11:
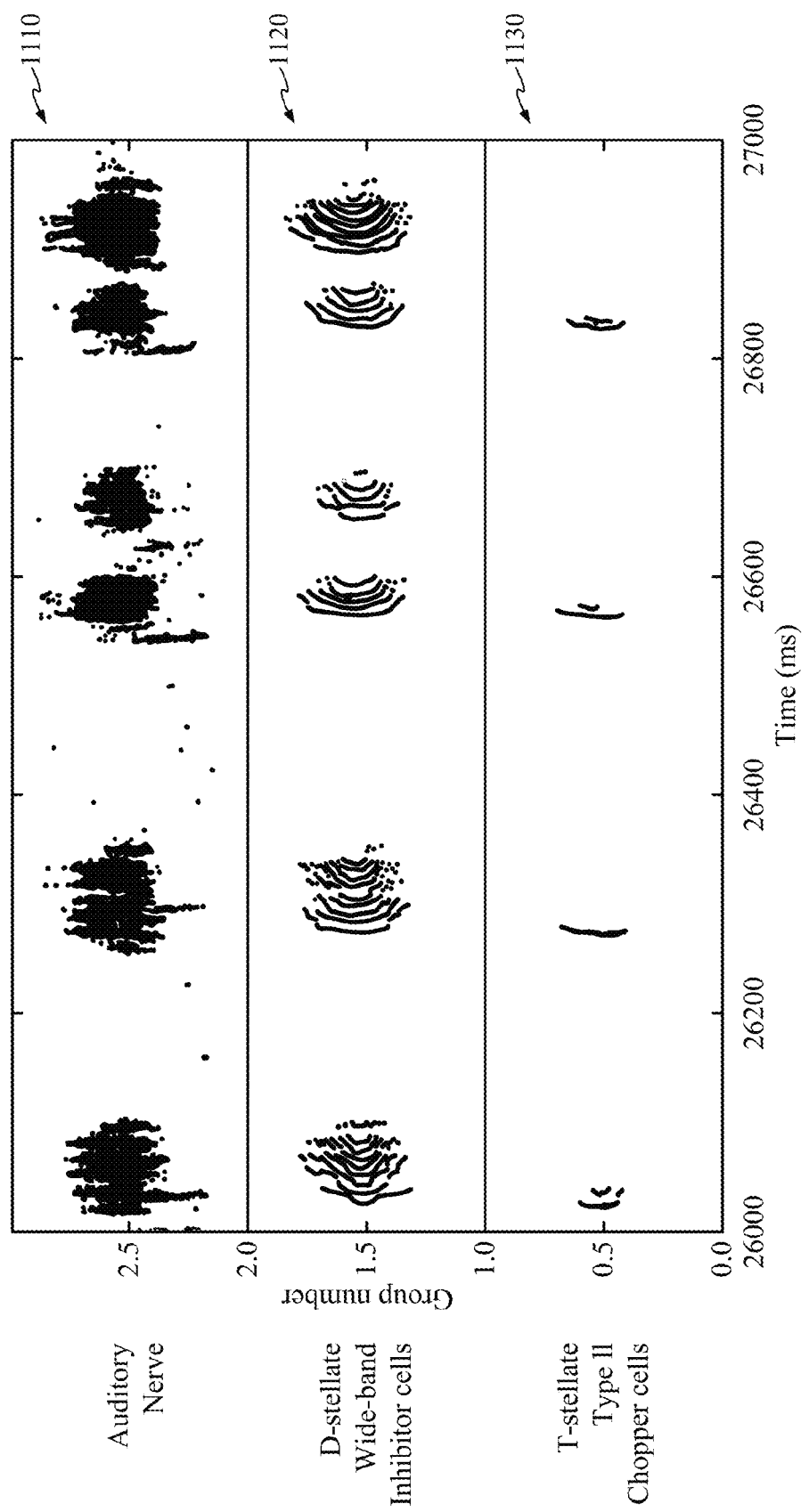
FIGS. 11-12 illustrate onset detection of an example auditory signal using wide-band inhibitor (WBI) cells and chopper cells, in accordance with certain aspects of the present disclosure.

FIG. 11 illustrates onset detection of an example auditory signal using chopper cells and WBI cells, in accordance with certain aspects of the present disclosure. Graph 1110 illustrates an electrical representation of the example auditory signal as the representation travels along the auditory nerve. Graph 1120 illustrates an output of the WBI cells after auditory processing of the electrical representation in graph 1110. Graph 1130 illustrates that the output of the chopper cells may be used for onset detection.

Figure 12:
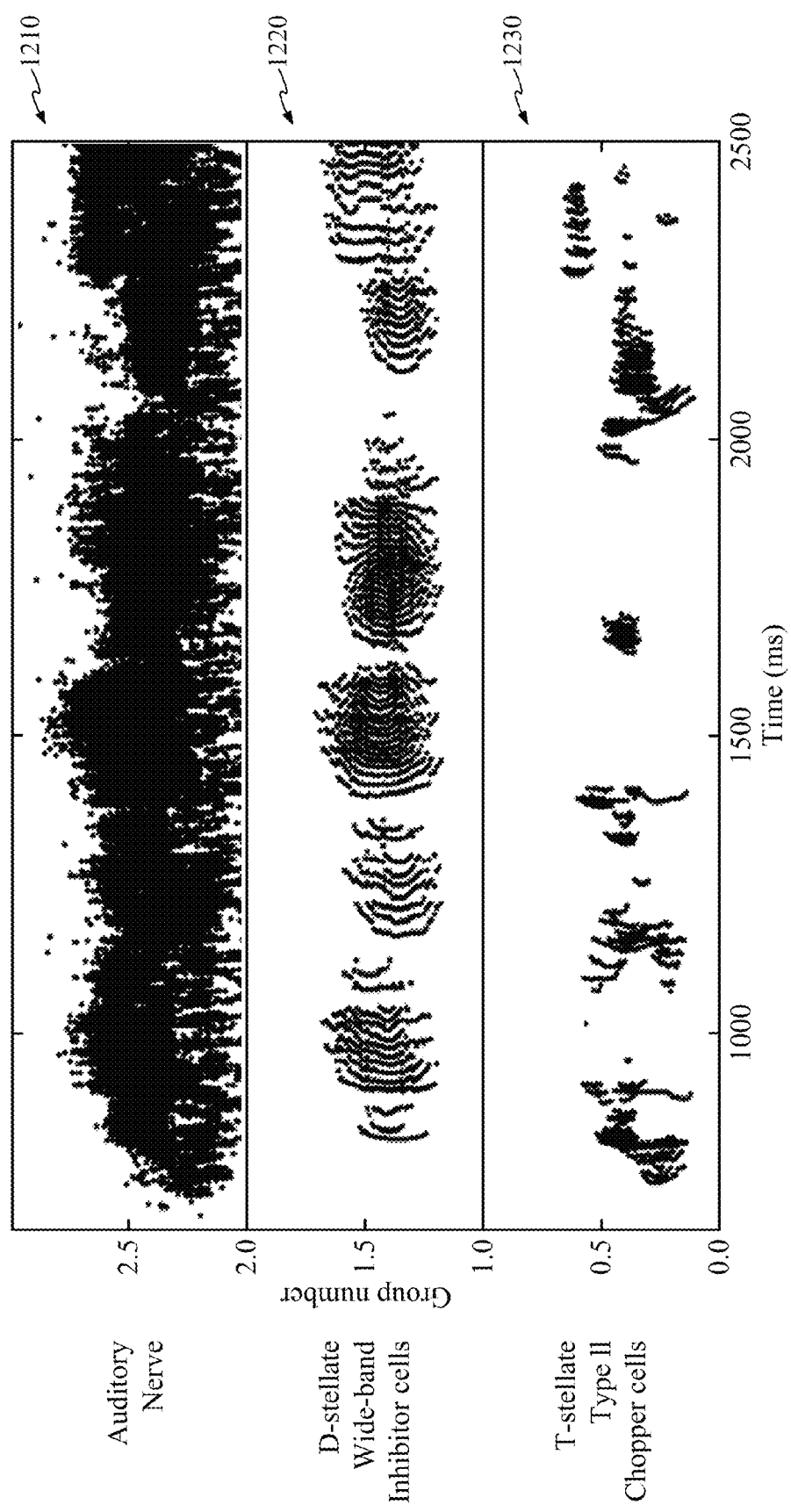

Similarly, FIG. 12 illustrates how the WBI cells with weaker feed-forward inhibition may sharpen a signal. Graph 1210 illustrates an electrical representation of an example auditory signal as the representation travels along the auditory nerve. The auditory signal in FIG. 12 is noisier than the signal in FIG. 11. As described above, WBI cells are broadly tuned and are maximally driven by white noise. Graph 1220 illustrates an output of the WBI cells after auditory processing of the electrical representation in graph 1210. Graph 1230 illustrates the output of the chopper cells.

While there are numerous conventional methods to perform onset detection on a signal, none acts upon a spiking representation of a signal. Spike-based onset detection will have additional advantages since such detection replicates a highly evolved biological system. One such advantage is the ability to adapt to changing auditory environments. The biological accuracy of the model may confer additional useful features of human auditory processing that are not yet known.

Figure 13:
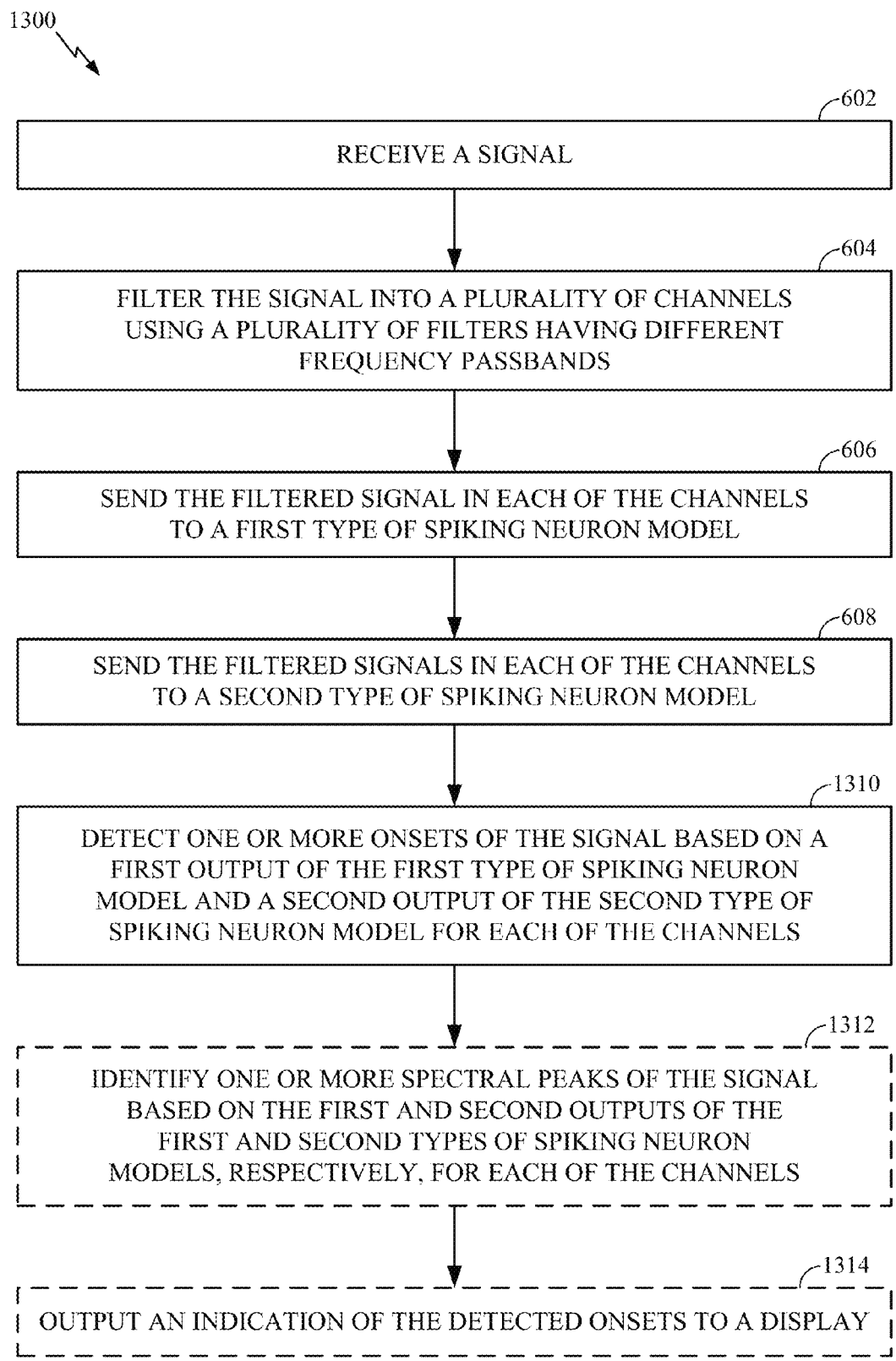
FIG. 13 is a flow diagram of example operations for performing onset detection of a signal, in accordance with certain aspects of the present disclosure.

FIG. 13 is a flow diagram of example operations 1300 for performing onset detection of a signal, in accordance with certain aspects of the present disclosure. The operations 1300 may be performed in hardware (e.g., by a processing system comprising one or more processing units), in software, or in firmware. The operations 1300 may begin with operations 602-608 as described above in relation to FIG. 6.

At 1310, one or more onsets of the signal may be detected, based on a first output of the first type of spiking neuron model and on a second output of the second type of spiking neuron model for each of the channels. For certain aspects as an option, the operations 1300 may further include identifying one or more spectral peaks of the signal based on the first and second outputs of the first and second types of spiking neuron models, respectively, for each of the channels. Optionally, the operations 1300 may further include outputting an indication of the detected onsets to a display at 1314.

According to certain aspects, detecting the onsets at 1310 may include sending the first output of the first type to a third type of spiking neuron model for each of the channels and sending the second output of the second type to a fourth type of spiking neuron model for each of the channels. The third type may differ from the fourth type in at least one characteristic. For certain aspects, the third type of spiking neuron model may represent a chopper cell in a ventral cochlear nucleus. The fourth type of spiking neuron model may represent a WBI cell in the ventral cochlear nucleus. For certain aspects, the at least one characteristic includes at least one of a spiking threshold or a bandwidth. For certain aspects, the third type has a lower spiking threshold and is more narrowly tuned than the fourth type of spiking neuron model. For certain aspects, the fourth type inhibits the third type of spiking neuron model for each of the channels.

According to certain aspects, detecting the onsets at 1310 may further include providing feedback inhibition to at least one of the third or fourth type of spiking neuron model with a fifth type of spiking neuron model for each of the channels. The fifth type of spiking neuron model may represent a vertical cell in a dorsal cochlear nucleus.

Figure 14:
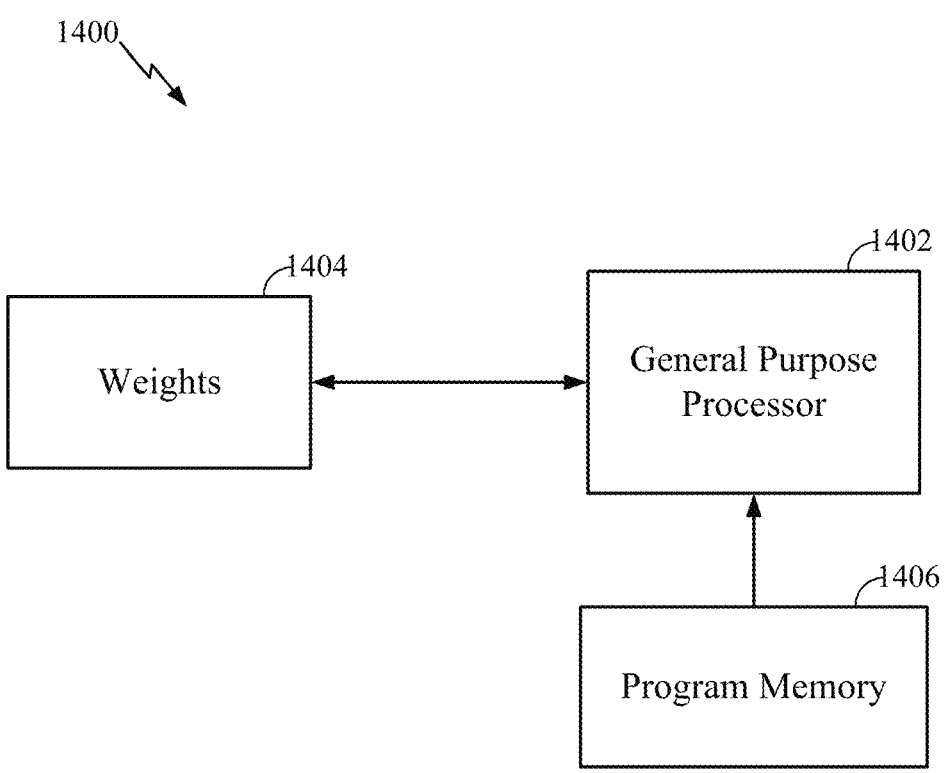
FIG. 14 illustrates an example software implementation of neural learning using a general-purpose processor, in accordance with certain aspects of the present disclosure.

FIG. 14 illustrates an example software implementation 1400 of the aforementioned method for neural processing using a general-purpose processor 1402 in accordance with certain aspects of the present disclosure. Weights (or other parameters) associated with each connection (synapse) of a computational network (neural network) may be stored in a memory block 1404, while instructions related to the neural processing being executed at the general-purpose processor 1402 may be loaded from a program memory 1406. In an aspect of the present disclosure, the instructions loaded into the general-purpose processor 1402 may comprise code for receiving a signal, code for filtering the signal into a plurality of channels using a plurality of filters having different frequency passbands, code for sending the filtered signal in each of the channels to a first type of spiking neuron model, and code for sending the filtered signal in each of the channels to a second type of spiking neuron model, wherein the second type differs from the first type of spiking neuron model in at least one parameter.

Figure 15:
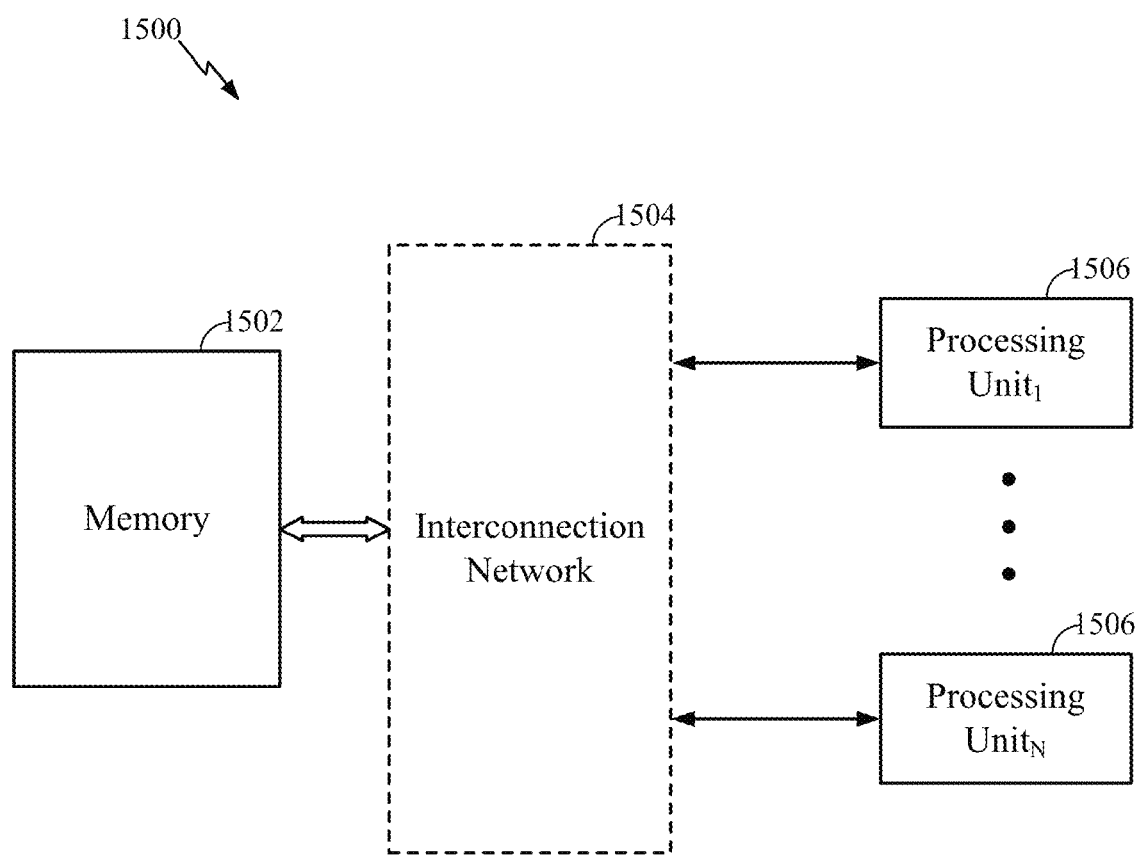
FIG. 15 illustrates an example implementation of neural learning in which a memory is interfaced with individual distributed processing units, in accordance with certain aspects of the present disclosure.
Figure 16:
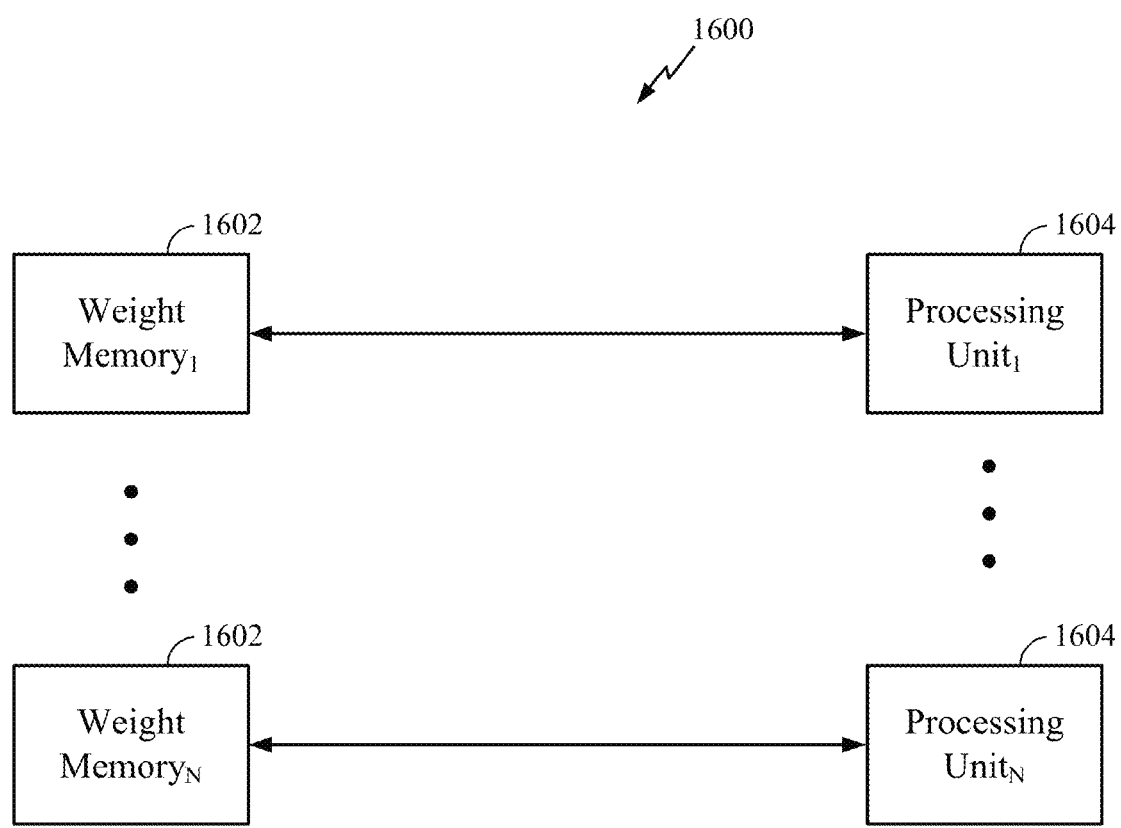
FIG. 16 illustrates an example implementation of neural learning based on distributed memories and distributed processing units, in accordance with certain aspects of the present disclosure.

FIG. 15 illustrates an example implementation 1500 of the aforementioned method for neural processing where a memory 1502 can be interfaced via an interconnection network 1504 with individual (distributed) processing units (neural processors) 1506 of a computational network (neural network) in accordance with certain aspects of the present disclosure. One or more weights (or other parameters) associated with one or more connections (synapses) of the computational network (neural network) may be loaded from the memory 1502 via connection(s) of the interconnection network 1504 into each processing unit (neural processor) 1506. In an aspect of the present disclosure, the processing unit 1506 may be configured to receive a signal, to filter the signal into a plurality of channels using a plurality of filters having different frequency passbands, to send the filtered signal in each of the channels to a first type of spiking neuron model, to send the filtered signal in each of the channels to a second type of spiking neuron model, and to identify one or more spectral peaks in the signal based on a first output of the first type of spiking neuron model and a second output of the second type of spiking neuron model for each of the channels FIG. 16 illustrates an example implementation 1600 of the aforementioned method for neural processing based on distributed weight (or other parameter) memories 1602 and distributed processing units (neural processors) 1604 in accordance with certain aspects of the present disclosure. As illustrated in FIG. 16, one memory bank 1602 may be directly interfaced with one processing unit 1604 of a computational network (neural network), where that memory bank 1602 may store one or more weights (or other parameters) of one or more connections (synapses) associated with that processing unit (neural processor) 1604. In an aspect of the present disclosure, the processing unit 1604 may be configured to receive a signal, to filter the signal into a plurality of channels using a plurality of filters having different frequency passbands, to send the filtered signal in each of the channels to a first type of spiking neuron model, to send the filtered signal in each of the channels to a second type of spiking neuron model, and to detect one or more onsets of the signal based on a first output of the first type of spiking neuron model and a second output of the second type of spiking neuron model for each of the channels.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for neural processing, comprising:
receiving a signal;
filtering the signal into a plurality of channels using a plurality of filters having different frequency passbands;
sending the filtered signal in each of the channels to a first type of spiking neuron model;
sending the filtered signal in each of the channels to a second type of spiking neuron model; and
identifying one or more spectral peaks in the signal based on a first output of the first type of spiking neuron model and a second output of the second type of spiking neuron model for each of the channels, wherein each of the spectral peaks comprises a relative concentration of power in a frequency spectrum of the signal.

2. The method of claim 1, wherein identifying the spectral peaks comprises:
sending the first output of the first type to a third type of spiking neuron model for each of the channels; and
sending the second output of the second type to a fourth type of spiking neuron model for each of the channels, wherein the third type differs from the fourth type in at least one characteristic.

3. The method of claim 2, wherein the third type of spiking neuron model represents a chopper cell in a cochlear nucleus.

4. The method of claim 3, wherein the fourth type of spiking neuron model represents a wideband inhibitor (WBI) cell in the cochlear nucleus.

5. The method of claim 2, wherein the at least one characteristic comprises at least one of a spiking threshold or a bandwidth.

6. The method of claim 2, wherein the third type has a lower spiking threshold and is more narrowly tuned than the fourth type of spiking neuron model.

7. The method of claim 2, wherein the fourth type inhibits the third type of spiking neuron model for each of the channels.

8. The method of claim 2, wherein identifying the spectral peaks comprises using feed-forward inhibition of the third type of spiking neuron model by the fourth type.

9. The method of claim 1, wherein the signal comprises an electrical representation of an audio signal.

10. The method of claim 9, wherein the plurality of channels span a hearing range of frequencies.

11. The method of claim 1, wherein the first type of spiking neuron model has a smaller dynamic range with respect to intensity and greater phase-locking capability than the second type of spiking neuron model.

12. The method of claim 1, wherein the first type of spiking neuron model is specialized for encoding temporal information and wherein the second type of spiking neuron model is specialized for encoding intensity information.

13. The method of claim 1, wherein the first type of spiking neuron model has a smaller fan-out than the second type of spiking neuron model.

14. The method of claim 1, wherein the first type of spiking neuron model represents a high spontaneous rate (HSR) neuron of an auditory nerve and the second type of spiking neuron model represents a low spontaneous rate (LSR) neuron of the auditory nerve.

15. The method of claim 1, further comprising outputting an indication of the spectral peaks to a display.

16. The method of claim 1, further comprising determining a frame timing from the spectral peaks.

17. An apparatus for neural processing, comprising:
a processing system configured to:
receive a signal;
filter the signal into a plurality of channels using a plurality of filters having different frequency passbands;
send the filtered signal in each of the channels to a first type of spiking neuron model;
send the filtered signal in each of the channels to a second type of spiking neuron model; and
identify one or more spectral peaks in the signal based on a first output of the first type of spiking neuron model and a second output of the second type of spiking neuron model for each of the channels.

18. The apparatus of claim 17, wherein the processing system is configured to identify the spectral peaks by:

sending the first output of the first type to a third type of spiking neuron model for each of the channels; and
sending the second output of the second type to a fourth type of spiking neuron model for each of the channels, wherein the third type differs from the fourth type in at least one characteristic.

19. The apparatus of claim 18, wherein the third type of spiking neuron model represents a chopper cell in a cochlear nucleus.

20. The apparatus of claim 19, wherein the fourth type of spiking neuron model represents a wideband inhibitor (WBI) cell in the cochlear nucleus.

21. The apparatus of claim 18, wherein the at least one characteristic comprises at least one of a spiking threshold or a bandwidth.

22. The apparatus of claim 18, wherein the third type has a lower spiking threshold and is more narrowly tuned than the fourth type of spiking neuron model.

23. The apparatus of claim 18, wherein the fourth type inhibits the third type of spiking neuron model for each of the channels.

24. The apparatus of claim 18, wherein the processing system is configured to identify the spectral peaks by using feed-forward inhibition of the third type of spiking neuron model by the fourth type.

25. The apparatus of claim 17, wherein the signal comprises an electrical representation of an audio signal.

26. The apparatus of claim 25, wherein the plurality of channels span a hearing range of frequencies.

27. The apparatus of claim 17, wherein the first type of spiking neuron model has a smaller dynamic range with respect to intensity and greater phase-locking capability than the second type of spiking neuron model.

28. The apparatus of claim 17, wherein the first type of spiking neuron model is specialized for encoding temporal information and wherein the second type of spiking neuron model is specialized for encoding intensity information.

29. The apparatus of claim 17, wherein the first type of spiking neuron model has a smaller fan-out than the second type of spiking neuron model.

30. The apparatus of claim 17, wherein the first type of spiking neuron model represents a high spontaneous rate (HSR) neuron of an auditory nerve and the second type of spiking neuron model represents a low spontaneous rate (LSR) neuron of the auditory nerve.

31. The apparatus of claim 17, wherein the processing system is further configured to output an indication of the spectral peaks to a display.

32. The apparatus of claim 17, wherein the processing system is further configured to determine a frame timing from the spectral peaks.

33. An apparatus for neural processing, comprising:
means for receiving a signal;
means for filtering the signal into a plurality of channels using a plurality of filters having different frequency passbands;
means for sending the filtered signal in each of the channels to a first type of spiking neuron model;
means for sending the filtered signal in each of the channels to a second type of spiking neuron model; and
means for identifying one or more spectral peaks in the signal based on a first output of the first type of spiking neuron model and a second output of the second type of spiking neuron model for each of the channels.

34. The apparatus of claim 33, wherein the means for identifying the spectral peaks is configured to:

send the first output of the first type to a third type of spiking neuron model for each of the channels; and
send the second output of the second type to a fourth type of spiking neuron model for each of the channels, wherein the third type differs from the fourth type in at least one characteristic.

35. The apparatus of claim 34, wherein the third type of spiking neuron model represents a chopper cell in a cochlear nucleus.

36. The apparatus of claim 35, wherein the fourth type of spiking neuron model represents a wideband inhibitor (WBI) cell in the cochlear nucleus.

37. The apparatus of claim 34, wherein the at least one characteristic comprises at least one of a spiking threshold or a bandwidth.

38. The apparatus of claim 34, wherein the third type has a lower spiking threshold and is more narrowly tuned than the fourth type of spiking neuron model.

39. The apparatus of claim 34, wherein the fourth type inhibits the third type of spiking neuron model for each of the channels.

40. The apparatus of claim 34, wherein the means for identifying the spectral peaks is configured to use feed-forward inhibition of the third type of spiking neuron model by the fourth type.

41. The apparatus of claim 33, wherein the signal comprises an electrical representation of an audio signal.

42. The apparatus of claim 41, wherein the plurality of channels span a hearing range of frequencies.

43. The apparatus of claim 33, wherein the first type of spiking neuron model has a smaller dynamic range with respect to intensity and greater phase-locking capability than the second type of spiking neuron model.

44. The apparatus of claim 33, wherein the first type of spiking neuron model is specialized for encoding temporal information and wherein the second type of spiking neuron model is specialized for encoding intensity information.

45. The apparatus of claim 33, wherein the first type of spiking neuron model has a smaller fan-out than the second type of spiking neuron model.

46. The apparatus of claim 33, wherein the first type of spiking neuron model represents a high spontaneous rate (HSR) neuron of an auditory nerve and the second type of spiking neuron model represents a low spontaneous rate (LSR) neuron of the auditory nerve.

47. The apparatus of claim 33, further comprising means for outputting an indication of the spectral peaks to a display.

48. The apparatus of claim 33, further comprising means for determining a frame timing from the spectral peaks.

49. A computer program product for neural processing, comprising a non-transitory computer-readable medium comprising instructions executable to:
receive a signal;
filter the signal into a plurality of channels using a plurality of filters having different frequency passbands;
send the filtered signal in each of the channels to a first type of spiking neuron model;
send the filtered signal in each of the channels to a second type of spiking neuron model; and
identify one or more spectral peaks in the signal based on a first output of the first type of spiking neuron model and a second output of the second type of spiking neuron model for each of the channels.

50. The computer program product of claim 49, wherein identifying the spectral peaks comprises:
sending the first output of the first type to a third type of spiking neuron model for each of the channels; and sending the second output of the second type to a fourth type of spiking neuron model for each of the channels, wherein the third type differs from the fourth type in at least one characteristic.

51. The computer program product of claim 50, wherein the third type of spiking neuron model represents a chopper cell in a cochlear nucleus.

52. The computer program product of claim 51, wherein the fourth type of spiking neuron model represents a wide-band inhibitor (WBI) cell in the cochlear nucleus.

53. The computer program product of claim 50, wherein the at least one characteristic comprises at least one of a spiking threshold or a bandwidth.

54. The computer program product of claim 50, wherein the third type has a lower spiking threshold and is more narrowly tuned than the fourth type of spiking neuron model.

55. The computer program product of claim 50, wherein the fourth type inhibits the third type of spiking neuron model for each of the channels.

56. The computer program product of claim 50, wherein identifying the spectral peaks comprises using feed-forward inhibition of the third type of spiking neuron model by the fourth type.

57. The computer program product of claim 49, wherein the signal comprises an electrical representation of an audio signal.

58. The computer program product of claim 57, wherein the plurality of channels span a hearing range of frequencies.

59. The computer program product of claim 49, wherein the first type of spiking neuron model has a smaller dynamic range with respect to intensity and greater phase-locking capability than the second type of spiking neuron model.

60. The computer program product of claim 49, wherein the first type of spiking neuron model is specialized for encoding temporal information and wherein the second type of spiking neuron model is specialized for encoding intensity information.

61. The computer program product of claim 49, wherein the first type of spiking neuron model has a smaller fan-out than the second type of spiking neuron model.

62. The computer program product of claim 49, wherein the first type of spiking neuron model represents a high spontaneous rate (HSR) neuron of an auditory nerve and the second type of spiking neuron model represents a low spontaneous rate (LSR) neuron of the auditory nerve.

63. The computer program product of claim 49, further comprising instructions executable to output an indication of the spectral peaks to a display.

64. The computer program product of claim 49, further comprising instructions executable to determine a frame timing from the spectral peaks.

* * * * *